Oct. 7, 1930.  F. A. OGBURN  1,777,700
CONVERTIBLE TABLE
Filed Jan. 30, 1928  2 Sheets-Sheet 1
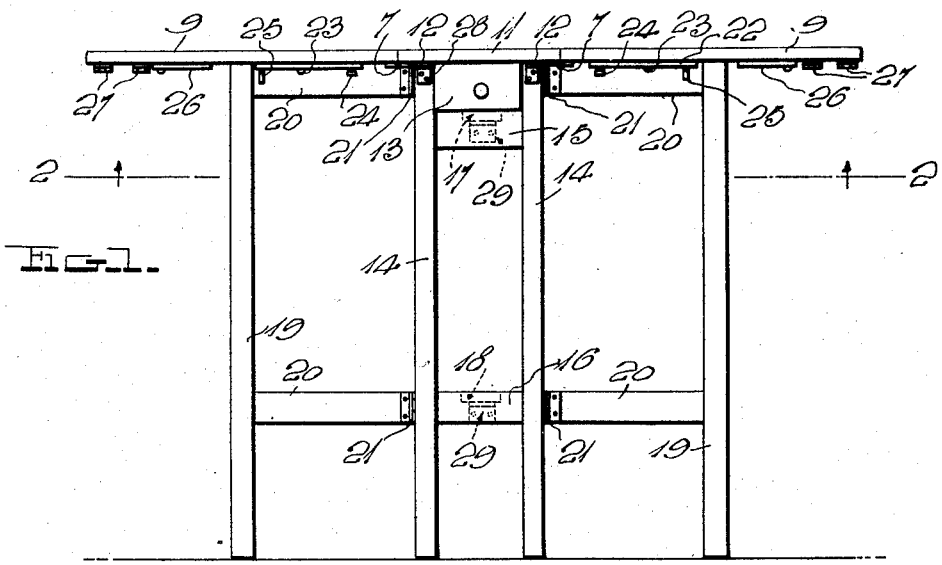
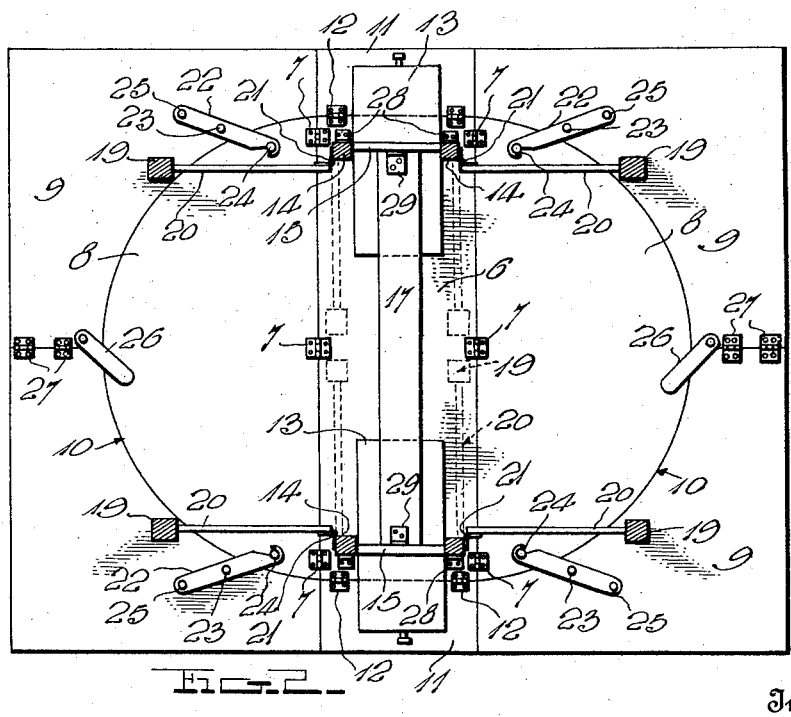
Witness
H. Woodard
Inventor
F. A. Ogburn
By H. B. Wilson Yeo
Attorneys Oct. 7, 1930.  F. A. OGBURN  1,777,700
CONVERTIBLE TABLE
Filed Jan. 30, 1928    2 Sheets-Sheet 2
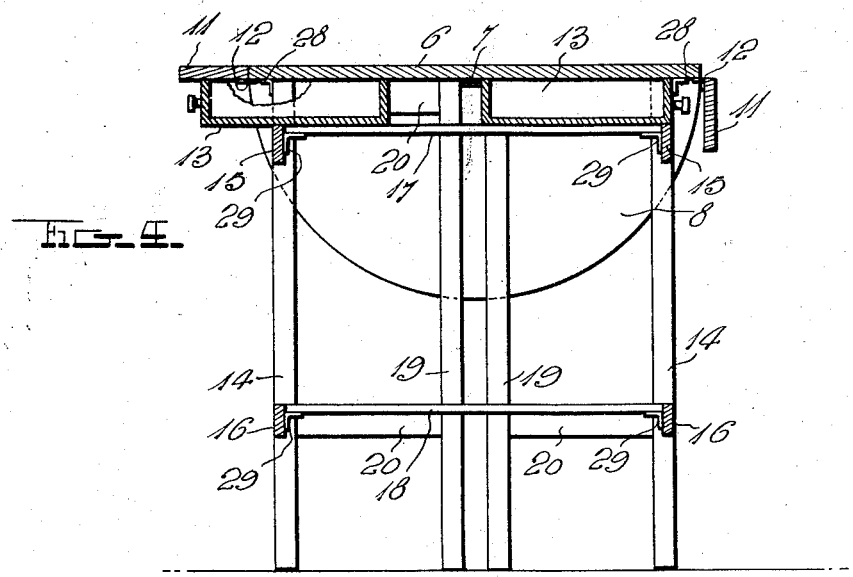
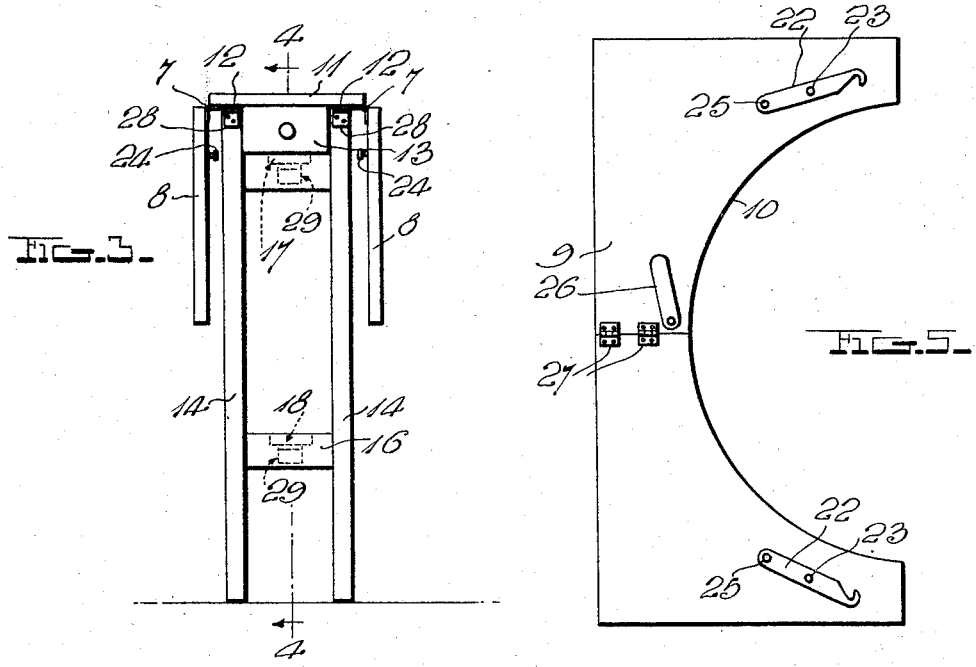
Inventor
F. A. Ogburn
Witness
H. Woodard
By H. R. Wilson & Co.
Attorneys Patented Oct. 7, 1930

1,777,700

UNITED STATES PATENT OFFICE

FRANCIS ASBURY OGBURN, OF HIGH POINT, NORTH CAROLINA

CONVERTIBLE TABLE

Application filed January 30, 1928. Serial No. 250,566.

The invention relates to new and useful improvements in tables and more particularly to those which are extensible and retractible in size.

The object of the invention is to provide a new and improved construction in which simple and inexpensive, yet efficient means are provided for varying the size of the table as occasion may demand, and with this object in view, the invention resides in the novel subject matter hereinafter described and claimed, the description being supplemented by the accompanying drawings.

Figure 1 is a side elevation showing the table fully extended.

Figure 2 is a horizontal sectional view on line 2—2 of Figure 1.

Figure 3 is an end elevation showing two of the hinged leaves folded downwardly from the main section of the top and illustrating one of the auxiliary leaves supported in raised position.

Figure 4 is a vertical section on line 4—4 of Figure 3.

Figure 5 is a bottom plan view of one of the detachable leaves.

In the drawings above briefly described, illustrating one manner of carrying the invention into effect, the numeral 6 designates a central, elongated, top section which is preferably of rectangular form. Connected with the longitudinal edges of this central section, by hinges 7, are two leaves 8, said leaves being either downwardly foldable to the position of Figure 3, or extensible as shown for instance in Figure 2.

Two detachable leaves 9 have their inner edges 10 shaped to snugly contact with the outer edges of the leaves 8, said edges being preferably curved as shown in Figure 2. These detachable leaves are of a length to project beyond the opposite ends of the leaves 8, and auxiliary leaves 11 are provided at the ends of the section 6, to fill the gaps between said projecting ends of said detachable leaves 9. These auxiliary leaves are preferably hinged at 12 to the ends of the section 6, and novel provision is made for holding said auxiliary leaves in cooperative relation with the leaves 8 and 9, and said section 6.

At 13 I have shown two drawers slidably mounted under the ends of the section 6, the outer ends of these drawers being obscured by the auxiliary leaves 11, when the latter are downwardly swung. When these auxiliary leaves are upwardly moved for use however, the drawers 13 are pulled out and they then serve the additional function of supporting said auxiliary leaves in cooperative relation with the leaves 8 and 9 and the section 6, to form a large table top.

While any desired leg structure could be used for supporting the central section 6, I have shown four legs 14. The legs at each end of said section are connected by upper and lower transverse members 15 and 16 respectively, and these members are in turn connected by longitudinal bars 17 and 18 respectively. The upper members 15 and the bar 17 may well slidably support the drawers 13, as shown.

For supporting the leaves 8 in extended position when the detachable leaves 9 are not used, and for also assisting in supporting said detachable leaves, I prefer to provide additional legs 19 having lateral arms 20, the latter being suitably hinged at 21 to the legs 14. When only the central section 6 of the table is to be used and the leaves 8 and 11 are to be downwardly swung, the legs 19 and arms 20 are inwardly swung to the position indicated by dotted lines in Figure 2. When only the hinged leaves 8 are to be upwardly swung and used in addition to the central section 6 to form a table of an intermediate size, the legs 19 may be outwardly swung from the aforesaid dotted line position, sufficiently to support said leaves 8. When the detachable leaves 9 and the auxiliary leaves 11 are to be brought into assembled relation with the other portions of the table top to provide a relatively large table, the legs 19 and arms 20 are outwardly swung substantially to the position shown in full lines in Figure 2, and said legs and portions of the uppermost arms, then engage the lower sides of the detachable leaves 9 as well as the leaves 8.

Any desired means may be employed for connecting the detachable leaves 9 with the leaves 8 to prevent separation thereof. For this purpose, merely as an illustration of one way of accomplishing the desired result, I have shown latches 22 pivoted at 23 to the lower sides of the leaves 9, the inner ends of said latches being engageable with headed studs 24 on the leaves 8, while the outer ends of said latches may be provided with appropriate operating handles or knobs 25.

If desired, turn buttons 26 may be pivoted to the sections 9 to underlie the leaves 8, as shown in Figure 2, assisting in holding said leaves in proper cooperative relation. In order that these leaves 9 may be compactly folded when detached, they are preferably formed of sections connected by hinges 27.

In constructing the table, I preferably make use of two wide boards to form the leaves 8 and 9, said boards being sawed on the curved line 10, so that accurate fitting of the inner edges of the leaves 9 against the outer edges of the leaves 8, will be insured. If desired, the auxiliary leaves 11 may be formed from pieces of wood cut from the ends of the board which forms the central section 6.

Preferably, the construction is such that it may be readily knocked down for shipment and storage, with the well known advantages. To accomplish this, the hinges 7 may have removable pintles if desired, which is also true of the hinges 12. Then too, the legs 14 are preferably attached to the table section 6, by brackets 28 and suitable screws. Similar brackets and screws 29 are preferably employed for detachably connecting the bars 17 and 18 with the transverse members 15 and 16.

It will be seen from the foregoing that a table of rather simple and inexpensive construction has been provided, yet that it is readily convertible for producing either a small side table or the like, a larger or buffet table (with leaves 8 extended) or a large dining table, with the leaves 8, 9 and 11 all in cooperative relation with the central section 6.

As excellent results have been obtained from the general construction disclosed, it is preferably followed. However, within the scope of the invention as claimed, variations may of course be made.

I claim:—

1. A table top comprising an elongated central section, two side leaves hinged to the longitudinal edges of said central section and co-extensive in length therewith, two end sections hinged to the ends of said central section and co-extensive in width with the latter, said end leaves projecting beyond said ends of said central section and beyond said side leaves when all four leaves are extended, and two detachable leaves notched to abut all outer edges of said side leaves, said detachable leaves being of a length co-extensive with the combined length of said central section and said end leaves and having inner edge portions adapted to abut said end leaves, and means for securing said central section and all of said leaves in a common plane when desired.

2. In a table, a top, a leaf hinged thereto for upward swinging into cooperative relation therewith, and a drawer slidably mounted under said top and having its outer end obscured by said leaf when the latter is downwardly swung, said drawer being outwardly movable under said leaf when the latter is raised, providing means for supporting the leaf in its raised position, said drawer being of a length to slide outwardly beyond said leaf when access to the interior of the drawer is desired.

In testimony whereof I have hereunto affixed my signature.

FRANCIS ASBURY OGBURN.